(12) United States Patent
Jeng et al.

(10) Patent No.: US 9,210,116 B2
(45) Date of Patent: Dec. 8, 2015

(54) METHOD AND SYSTEM OF PROVIDING FILE-RELATED SOCIAL NETWORK INTERACTION UNDER CLOUD STORAGE SERVICE AND COMPUTER READABLE RECORDING MEDIUM STORED WITH THE METHOD

(71) Applicant: Institute for Information Industry, Taipei (TW)

(72) Inventors: Yu-Lin Jeng, Tainan (TW); Bang-Min Shiue, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 390 days.

(21) Appl. No.: 13/713,046

(22) Filed: Dec. 13, 2012

(65) Prior Publication Data
US 2014/0136635 A1    May 15, 2014

(30) Foreign Application Priority Data
Nov. 14, 2012   (TW) .............................. 101142400 A

(51) Int. Cl.
G06F 15/16    (2006.01)
H04L 12/58    (2006.01)

(52) U.S. Cl.
CPC ................ *H04L 51/32* (2013.01); *H04L 51/22* (2013.01)

(58) Field of Classification Search
None
See application file for complete search history.

(56) References Cited

U.S. PATENT DOCUMENTS

| | | | |
|---|---|---|---|
| 8,171,128 B2 | 5/2012 | Zuckerberg et al. | |
| 2011/0087692 A1* | 4/2011 | Masone | 707/769 |
| 2011/0276656 A1 | 11/2011 | Knapp et al. | |
| 2012/0151568 A1 | 6/2012 | Pieczul et al. | |
| 2012/0290647 A1* | 11/2012 | Ellison et al. | 709/203 |
| 2013/0218961 A1* | 8/2013 | Ho | 709/204 |
| 2014/0129703 A1* | 5/2014 | Patel et al. | 709/224 |

OTHER PUBLICATIONS

Taiwan Office Action dated Sep. 30, 2014.

* cited by examiner

*Primary Examiner* — Brian P Whipple
(74) *Attorney, Agent, or Firm* — McClure, Qualey & Rodack, LLP

(57) ABSTRACT

The present invention provides a method of providing file-related social network interaction under cloud storage service, which comprises: (a) a cloud server synchronizes a plurality of share files transmitted from any local computer to synchronization file folders of all the other local computers; (b) the cloud server gathers all social network feedback messages from all the local computers and user accounts thereof; and (c) when a social network feedback ranking table is opened, the cloud server provides a plurality of latest social network feedback messages relative to the share files and names of the share files and the user accounts to the local computer, thereby allowing the social network feedback ranking table to be made.

33 Claims, 8 Drawing Sheets

| user account | share file | social network feedback | occurrence time | similar file providing | codes of local computers |
|---|---|---|---|---|---|
| 271 | 272 | 273 | 274 | 275 | 276 |
| | | | | | |
| | | | | | |

METHOD AND SYSTEM OF PROVIDING FILE-RELATED SOCIAL NETWORK INTERACTION UNDER CLOUD STORAGE SERVICE AND COMPUTER READABLE RECORDING MEDIUM STORED WITH THE METHOD

RELATED APPLICATIONS

This application claims priority to Taiwan Application Serial Number 101142400, filed Nov. 14, 2012, which is herein incorporated by reference.

BACKGROUND

1. Technical Field

The present invention relates to a method and a system of providing file-related social network interaction under cloud storage service and a computer readable recording medium stored with the method.

2. Description of Related Art

With the establishment of networks, more and more users enjoy the convenience of transmitting data or providing various types of services by the networks. A cloud storage service can remotely provide a plurality of users in the same social network to share files with each other through the networks. Through a remote cloud storage server, the file-sharing user can synchronizes the share file to the mainframe of each file-receiving user, thereby allowing the file-receiving user to jointly access the share file.

However, the data can be shared with others through the cloud storage service but the preferential response to the data by the file-receiving/sharing users cannot be known.

SUMMARY

One solution provided by the present invention is to provide a method of providing file-related social network interaction under cloud storage service, which can be used for consolidating the social network feedback messages of all the synchronized share files provided by all the social network members in a local file folder, thereby understanding the social network trend and operation history of all the share files, such as how popular or how many times has the file been shared.

Another solution provided by the present invention is to provide a method of providing file-related social network interaction under cloud storage service, wherein while individually viewing the share files, the social network members can timely express his/her social network feedback message towards a particular share file, such as favor or commend, thereby achieving the objective of interacting with social network members.

In actual practice, the mentioned method of providing file-related social network interaction under cloud storage service can be a computer program which is stored in a computer readable recoding medium. Thus, the computer can read the mentioned computer readable recording medium for processing the method of providing file-related social network interaction under cloud storage service. When the method is implemented on a cloud server and a plurality of local computer establishing connections with the cloud server, comprises the steps of: (a) the cloud server synchronizes a plurality of share files transmitted from any of the local computers to synchronization file folders of all the other local computers; (b) the cloud server gathers a plurality of social network feedback messages relative to the share files transmitted from all the local computers and user accounts that respectively send the social network feedback messages and stores in the cloud server; and (c) when a social network feedback ranking table of the synchronization file folder of any of the local computers is opened, the local computer requires the cloud server through networks to provide a plurality of latest social network feedback messages relative to the share files stored in the cloud server and names of the share files respectively corresponding to the social network feedback messages to the local computer, thereby allowing the local computer to make the social network feedback ranking table.

In the implementation of the present invention, through operating the file management module of any of the local computers, a social network feedback message relative to a particular synchronized share file can be timely expressed, so the social network members can share files and exchange commends about the files, thereby achieving the objective of social network interaction. In addition, by gathering the social network feedback messages in a local file folder, the social network trend of all the synchronized share files provided by each social network member can be directly known, such as how popular and how many times has the file been shared.

BRIEF DESCRIPTION OF THE DRAWINGS

The present invention will be apparent to those skilled in the art by reading the following detailed description of a preferred embodiment thereof, with reference to the attached drawings, in which:

FIG. 3 is a schematic view illustrating a table of the social network feedback database shown in FIG. 2, according to one embodiment of the present invention;

DESCRIPTION OF THE EMBODIMENTS

Figure 1:
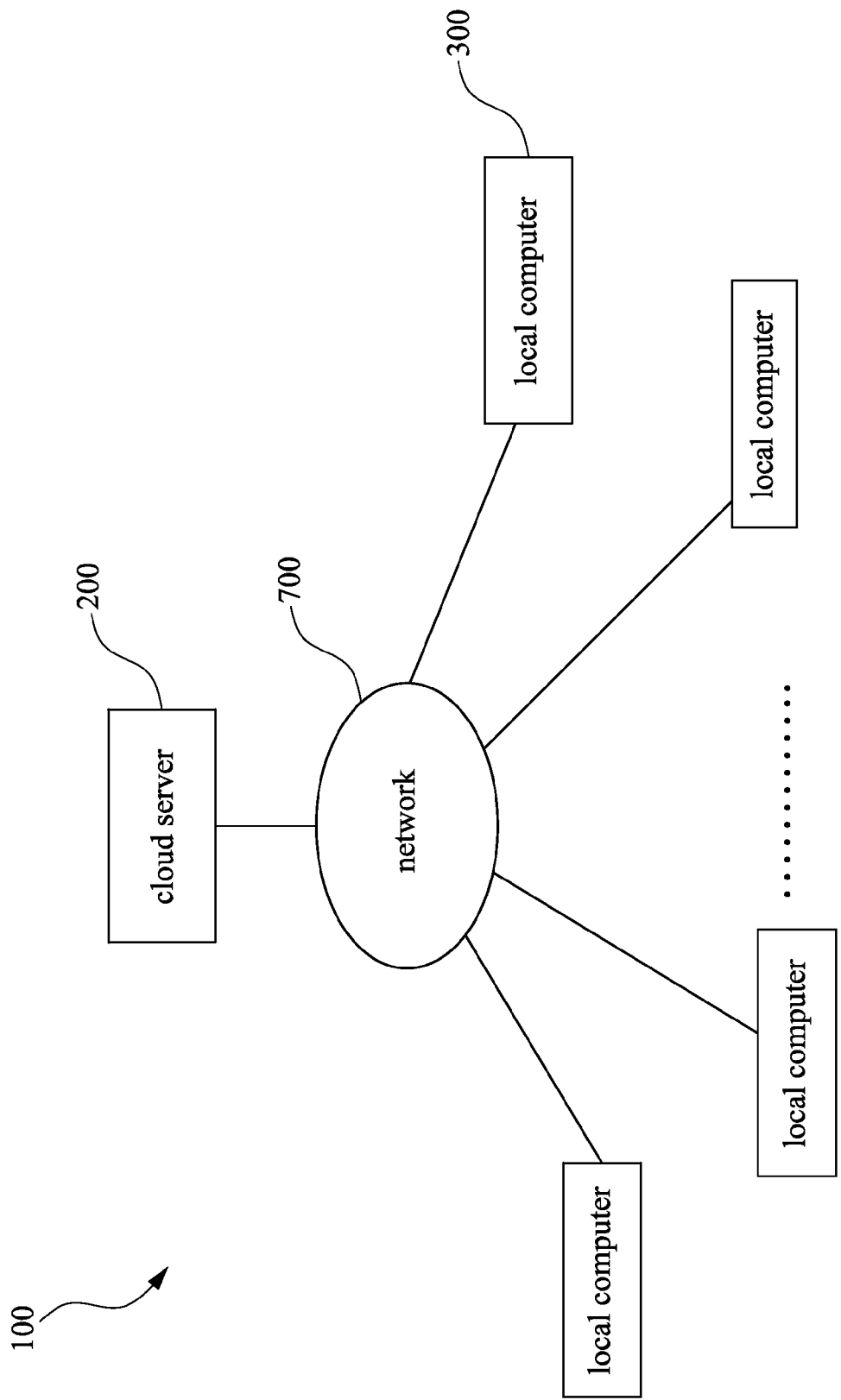
FIG. 1 is a function block diagram illustrating the system of providing file-related social network interaction under cloud storage service, according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Reference is now made to FIG. 1 in which FIG. 1 is a function block diagram illustrating the system of providing file-related social network interaction under cloud storage service 100, according to one embodiment of the present invention. As shown in FIG. 1, the system of providing file-related social network interaction under cloud storage service 100 comprises a cloud server 200 and a plurality of local computers 300. The local computers 300 are respectively connected with the cloud server 200 through networks 700.

Because the local computers 300 are set for sharing messages, when one of the local computers 300 (i.e. file-sharing computer) uploads at least one share file to be synchronized to the cloud server 200, the particular share file is backup by the cloud server 200, and meanwhile downloaded to all the other local computers 300 (i.e. file-receiving computers), so the share file in its latest-version can be stored or updated in all the other file-receiving computers; in other words, the cloud server 200 synchronizes the share file of the file-sharing computer to all the other file-receiving computers.

Each local computer 300 is able to send a social network feedback message relative to the share file, such as any combination of favored, disliked, recommended and/or comment; thus, other users of the local computers 300 can browse the social network feedback message for further understanding the social network reaction trend of one single share file or all the share files, such as how popular or how many times has the file been shared, relative comments, thereby achieving a function of social network members interacting with each other.

Figure 2:
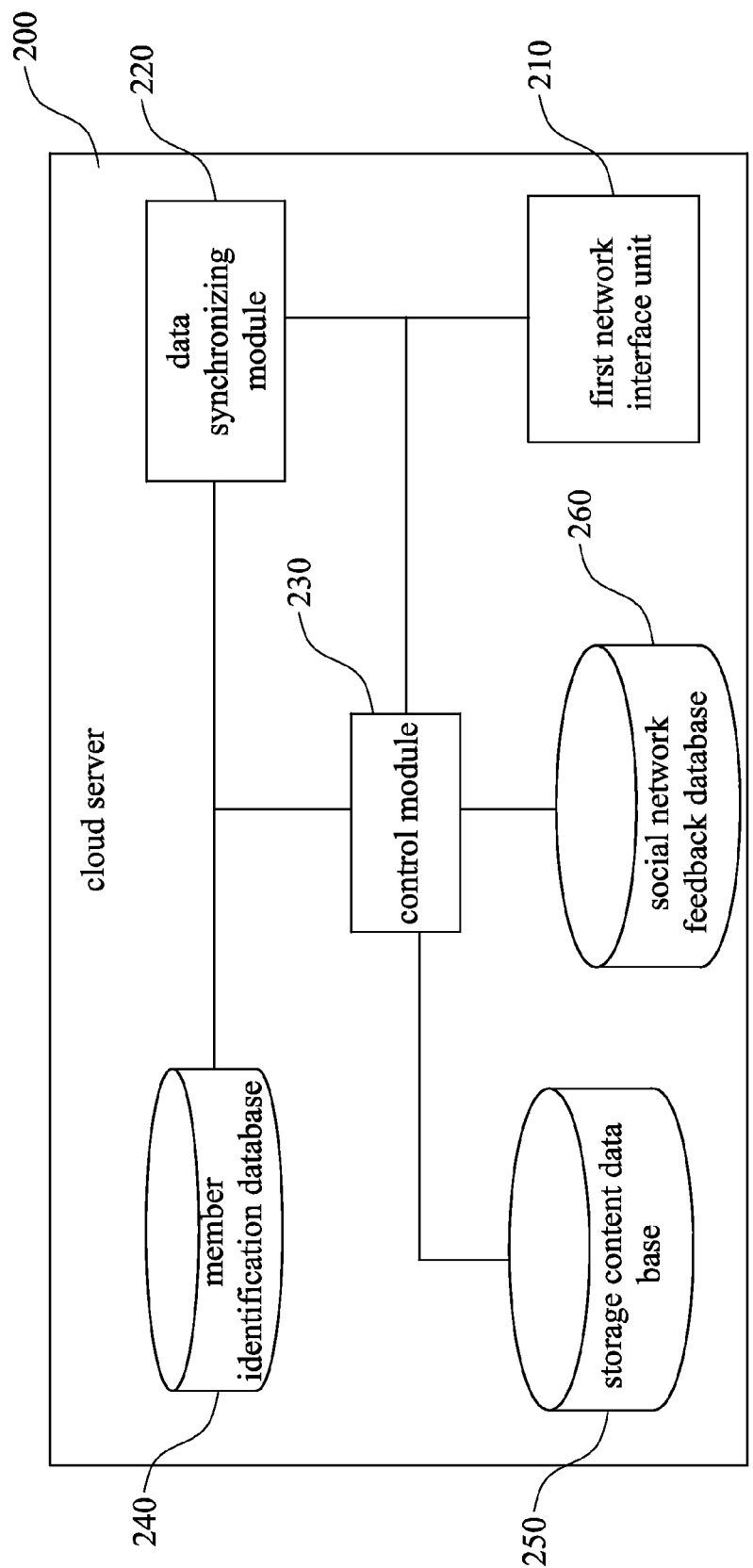
FIG. 2 is a function block diagram illustrating the cloud server shown in FIG. 1.

Reference is now made to FIG. 2, FIG. 2 is a function block diagram illustrating the cloud server 200 shown in FIG. 1.

As shown in FIG. 1 and FIG. 2, the cloud server 200 at least comprises a first network interface unit 210, a data synchronizing module 220 and a control module 230. The first network interface unit 210 can be respectively connected with the local computers 300 through the networks 700. The data synchronizing module 220 is electrically connected with the first network interface unit 210 and the control module 230, and is used for receiving a share file to be synchronized from one of the local computers 300 (i.e. file-sharing computer), then synchronizing the share file to all the other local computers 300 (i.e. file-receiving computers) through the first network interface unit 210.

In addition, the cloud server 200 further comprises a plurality of databases, e.g., a member identification database 240, a storage content database 250 and a social network feedback database 260. The member identification database 240 at least records the relative background data of each user, such as the user account, password, email address, preference, and other user accounts (more than one can be chosen) set by the user for the purpose of sharing and the email addresses of the set user accounts. The storage content database 250 is electrically connected with the control module 230 and the data synchronizing module 220, and is stored with the share files that each user uploads to the cloud server 200 for the purpose of backup or sharing. In details, when the data synchronizing module 220 receives the share file to be synchronized from one of the local computers 300 (i.e. file sharing computer), the share file is backup in the storage content database 250.

Reference is now made to FIG. 3, which is a schematic view illustrating a table 270 of the social network feedback database 260 shown in FIG. 2, according to one embodiment of the present invention.

As shown in FIG. 2 and FIG. 3, the social network feedback database 260 is electrically connected with the first network interface unit 210 and the control module 230, and is used for receiving and storing at least a data table 270 formed by a plurality of statistics in the database. The data table 270 comprises user account columns 271, share file columns 272, social network feedback columns 273, occurrence time columns 274 and codes of local computers 300 columns 276.

The social network feedback columns 273 contain any type of social network feedback message uploaded from the local computers 300, such as "the share file being opened" message, "the shared file being edited" message, "the share file being favored" message, "the shared file being disliked" message, "the share file being recommended" message, and comments about the share file. However, the types of social network feedback messages are not limited to what has been disclosed, other types can be added according to actual needs. The share file columns 272 contain the names of the share files corresponding to the social network feedback messages. The user account columns 271 contain the user accounts that send the social network feedback messages. The occurrence time columns 274 contain the time that the social network feedback message being sent. The codes of local computers 300 columns 276 contain the codes of local computers 300 which have logged in with the user accounts. Furthermore, the data table 270 comprises a similar file providing column 275. The similar file providing column 275 contains a shortcut pointed to the mention similar file.

The control module 230 is electrically connected with the data synchronizing module 220, a message management module, the first network interface unit 210 and the mentioned databases, and is used for commanding each module to perform the assigned work and accessing the corresponding data from the databases.

Figure 4:
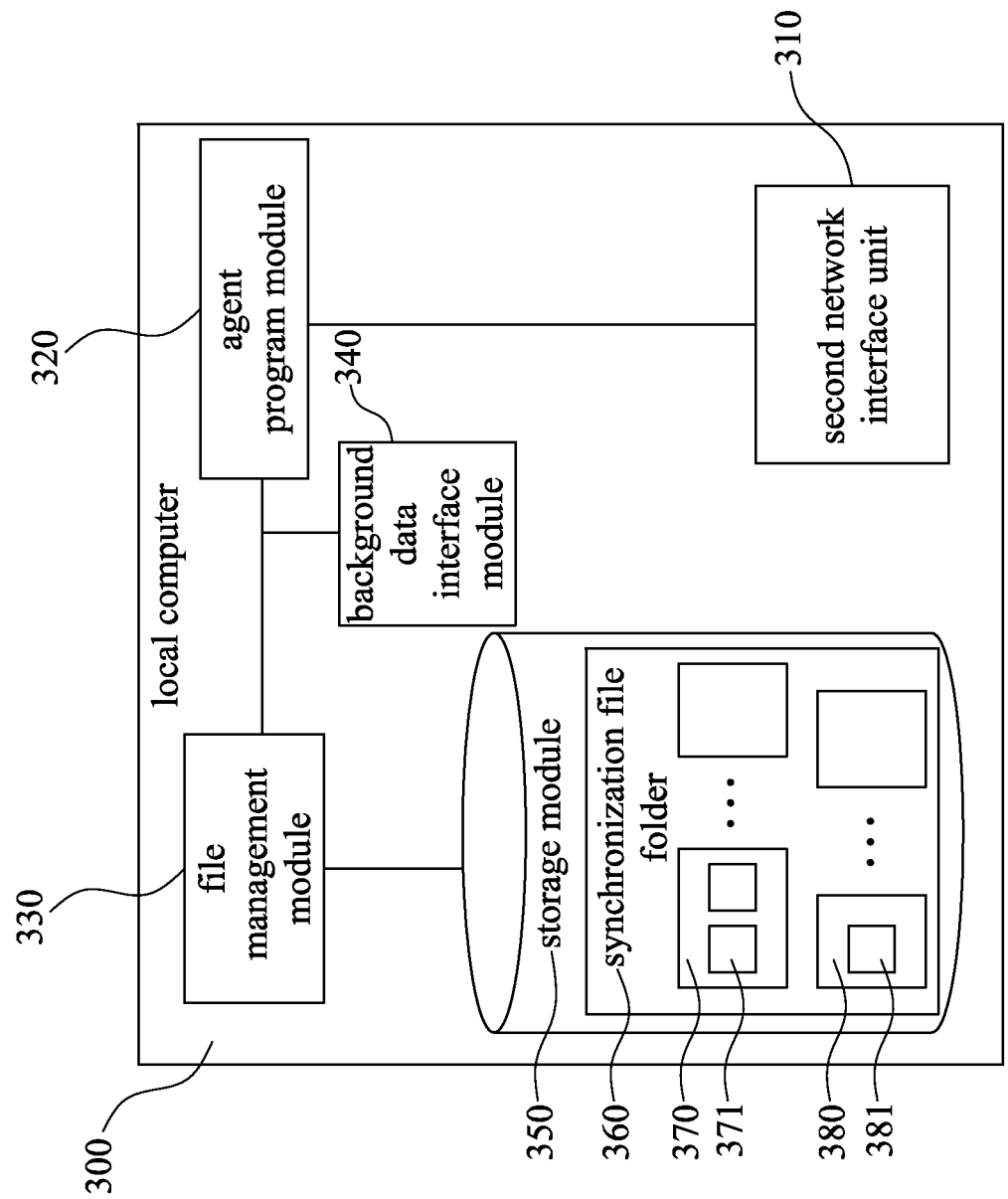
FIG. 4 is a function block diagram illustrating the local computer shown in FIG. 1.

FIG. 4 is a function block diagram illustrating the local computer 300 shown in FIG. 1.

As shown in FIG. 1 and FIG. 4, each local computer 300 at least comprises a second network interface unit 310, an agent program module 320, a file management module 330 and at least a storage module 350. With a pre-determined IP address of the cloud server 200, the second network interface unit 310 can be connected with the cloud server 200 through the networks 700. The user of each local computer 300 can use at least a user account to allow the local computer 300 to be connected with the cloud server 200, thereby being allowed to receive services provided by the cloud server 200. What shall be addressed is that each user account is unique, therefore when each local computer 300 sends any type of social network feedback message, the user account used in each local computer 300 would also be recorded in the social network feedback database 260. The agent program module 320 is electrically connected with the second network interface unit 310 and the storage module 350, and is used for processing the share file synchronization required by the data synchronizing module 220 of the cloud server 200, the share file synchronized by the cloud server 200 is then stored in one synchronization file folder 360 of the storage module 350, i.e. the synchronization file folder 360 is preset for specially storing the share file. The storage module 350 is a non-volatile memory, the type thereof is not limited, for example a flash memory, soft disk, hard disk, optical disk, mobile disk or tape can be adopted. The file management module 330 is connected with the agent program module 320 and the storage module 350, and allows users to browse or open the share files or other files in sub folders of the synchronization file folder 360.

Figure 5:
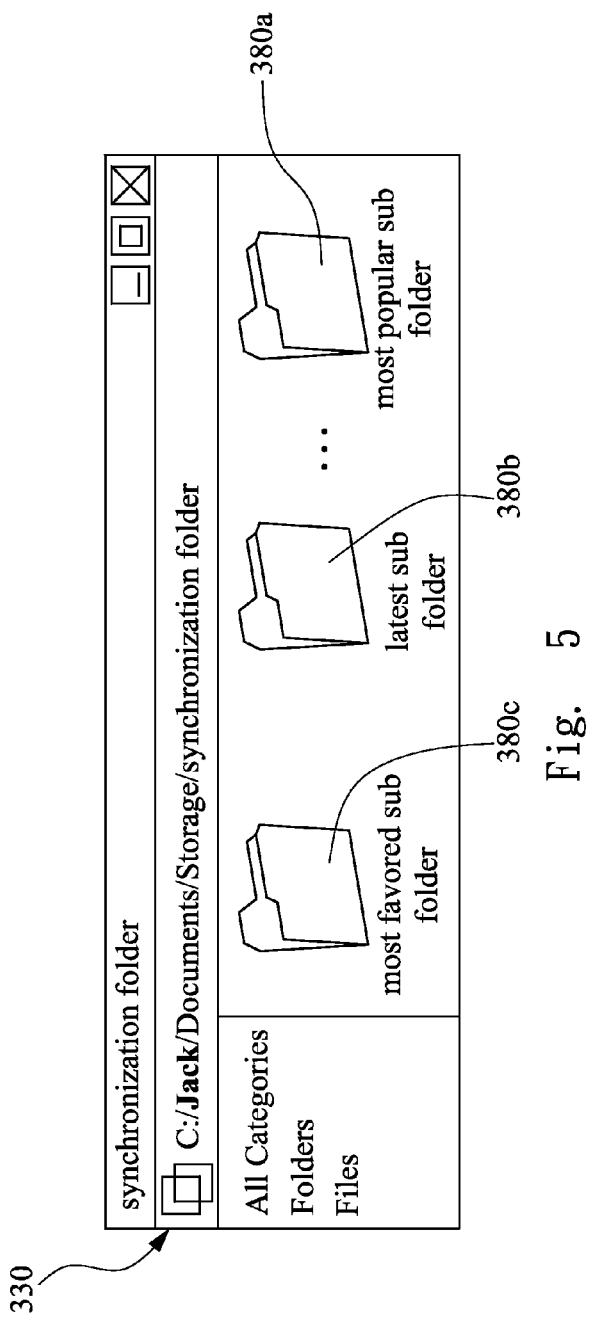
FIG. 5 is a schematic view illustrating the file management module shown in FIG. 4 showing a synchronization file folder.
Figure 6:
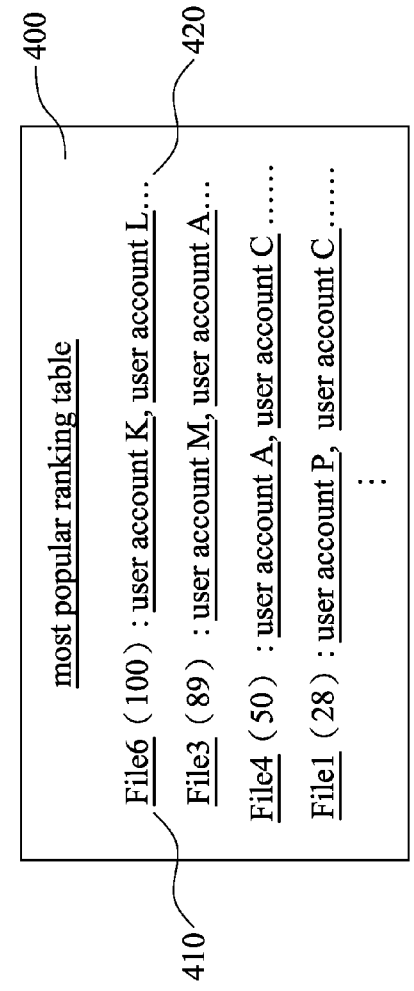
FIG. 6 is a schematic view illustrating a most favored ranking table in the most favored sub folder shown in FIG. 5.

Reference is now made to FIG. 5 and FIG. 6 in which FIG. 5 is a schematic view illustrating the file management module 330 shown in FIG. 4 showing a synchronization file folder

360; and FIG. 6 is a schematic view illustrating a most favored ranking table in the most favored sub folder 380*a* shown in FIG. 5.

As shown in FIG. 4 and FIG. 5, substantially, one synchronization file folder 360 of the storage module 350 can further comprises a plurality of first sub folders 370 and a plurality of second sub folders 380. Any first sub folder 370 can be used for storing the share file 371. Any second sub folder 380 can be respectively storing a social network feedback ranking table 400 of one type of social network feedback message of. According to this embodiment, by showing through the file management module 330, the mentioned second sub folders 380 can be for example a "most favored" sub folder 380*a*, a "latest" sub folder 380*b* and a "most popular" sub folder 380*c*. The "most favored" sub folder 380*a* can be used for storing the social network feedback ranking table 400 of the most favored share files (e.g., a most favored ranking table shown in FIG. 6).

When the social network feedback ranking table 400 is opened by the file management module 300, the social network feedback ranking table 400 is made and provided. The social network feedback ranking table 400 comprises the names of all the share files 371, the number of times that the social network feedback message being sent and the user accounts that respectively send the social network feedback messages. Furthermore, for not occupying the space of the social network feedback ranking table 400, the social network feedback ranking table 400 can be made with respect to the number of times that the social network feedback messages being sent, such that the names of the share ranked in top, e.g., the top four or the top ten, the current number of times of being sent and the user accounts that respectively send the social network feedback messages.

Thus, with the social network feedback ranking table 400, users can be aware of the social network trend of all the synchronized share files and the history of the files, such as how popular and how many times has the file been shared.

According to one alternative of this embodiment, the share files listed on the social network feedback ranking table 400 can respectively comprises a linkage shortcut 410. When any linkage shortcut 400 is clicked, the share file in the local computer 300 corresponding to the name of the share file 371 is directly opened by the file management module 300. Thus, this embodiment of the present invention provides a novel file management system 100 interface for replacing the conventional file system 100, and each type of users can rapidly access and browse files, or even directly open and use the files.

Figure 7:
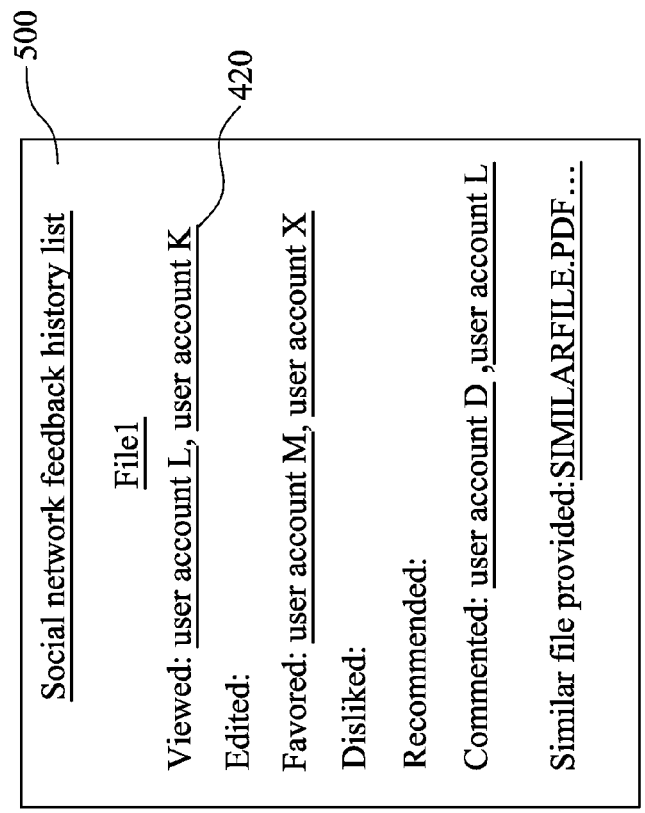
FIG. 7 is a schematic view showing a social network feedback history list relative to the share file, according to one embodiment of the present invention.

Reference is now made to FIG. 6 and FIG. 7 in which FIG. 7 is a schematic view showing a social network feedback history list 500 relative to the share file, according to one embodiment of the present invention. According to another alternative of this embodiment, the share files listed on the social network feedback ranking table 400 respectively comprises a linkage shortcut 410. Each linkage shortcut 410 is pointed to a social network feedback history list 500 relative to a particular share file. For example, if the file 1 shown in FIG. 6 is clicked, the linkage shortcut 410 of the file 1 would point to a social network feedback history list 500 relative to the file 1 (as shown in FIG. 7). The social network feedback history list 600 comprises all the user accounts that have sent any type of social network feedback messages relative to the file 1. From the social network feedback history list 600, the information such as the user account L has viewed the file 1 and the user account M has favored the file 1 can be obtained.

Thus, users can be more aware of the particular share file 371, thereby increasing more reference information relative to the share file 371.

What shall be addressed is that for increasing more data, the social network feedback history list 600 can also show the occurrence time corresponding to each user sending the social network feedback message and/or the code of the local computer 300.

Figure 8:
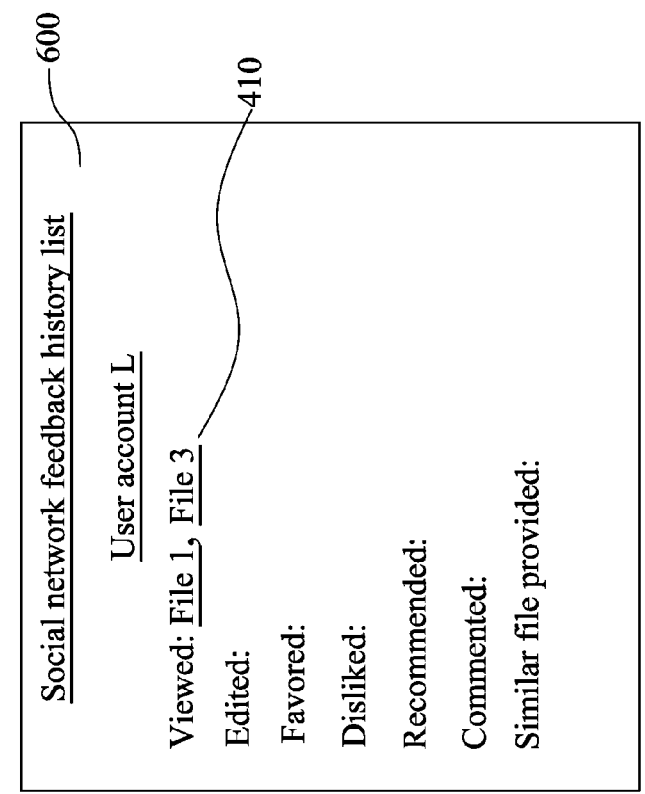
FIG. 8 is a schematic view showing a social network feedback history list relative to the user account, according to one embodiment of the present invention.

Reference is now made to FIG. 6 and FIG. 8 in which FIG. 8 is a schematic view showing a social network feedback history list 600 relative to the user account, according to one embodiment of the present invention.

According to one another alternative of this embodiment, the user accounts listed on the social network feedback ranking table 400 respectively comprises a linkage shortcut 420, when any linkage shortcut 420 is clicked, each linkage shortcut 420 would point to a social network feedback history list 600 relative to the particular user account. For example, if the user account L shown in FIG. 6 is clicked, the linkage shortcut 420 of the user account L would point to a social network feedback history list 600 relative to the user account L (as shown in FIG. 8). The social network feedback history list 600 comprises whether the user account L has sent any type of social feedback message relative to a share file. For example, from the social network feedback history list 600, the information of the user account L has viewed the file 1 and the file 3 can be obtained. Thus, users can be more aware of the share filed which has been viewed by a particular user account, thereby increasing more sources of share files.

However, for increasing more information, the social network feedback history list can also shows the occurrence time corresponding to each user sending the social network feedback message and/or the code of the local computer 300.

What shall be addressed is that any user account shown in FIG. 6 and FIG. 7 can all be a linkage shortcut 420 pointing to the social network feedback history list 600 shown in FIG. 8. As shown in FIG. 6 and FIG. 8, the name of any share file can be a shortcut 410 pointing to the social network feedback history list 500 shown in FIG. 7 or used for directly opening the corresponding share file 371.

According to still one another alternative of this embodiment, the names of the share files listed on the social network feedback history list 600 respectively comprise a linkage shortcut 410, when any linkage shortcut 410 is clicked in any local computers 300, the local computer 300 would require the cloud server 200 through the networks 700 to send a plurality of latest social network feedback messages relative to the particular share file 371 and the user accounts that respectively send the social network feedback message to the local computer 300, thereby forming a social network feedback history list 500 relative to the particular share file 371.

Figure 9:
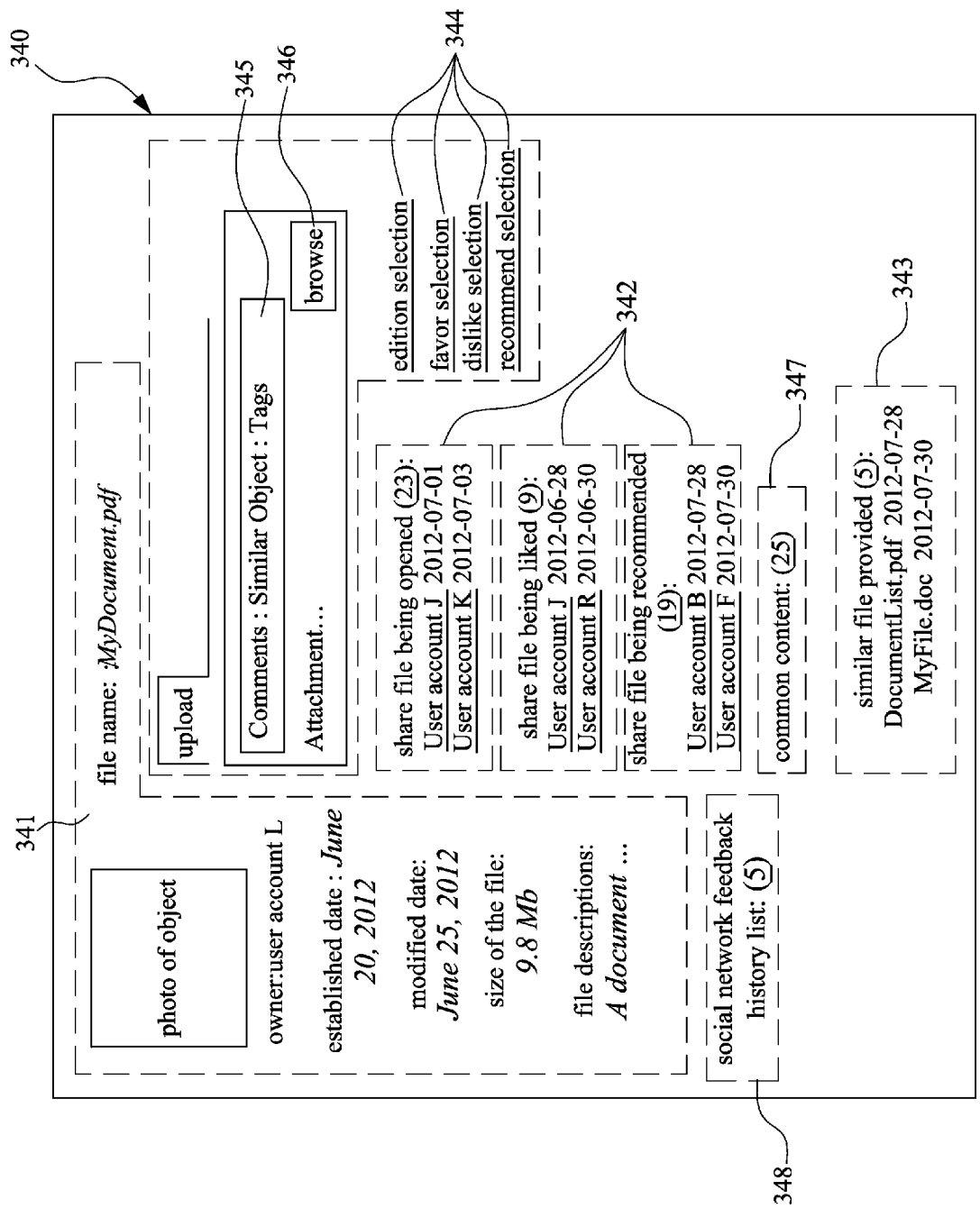
FIG. 9 is a schematic view showing the background data interface module shown in FIG. 4, according to one embodiment of the present invention.

FIG. 9 is a schematic view showing the background data interface module 340 shown in FIG. 4, according to one embodiment of the present invention.

As shown in FIG. 4 and FIG. 9, when a background data interface module 340 of any share file in the first sub folder 370 of the synchronization file folder 360 is opened through the file management module 330, the background data interface module 340 is provided.

The background data interface module 340 at least comprises a basic data zone 341, a plurality of social network feedback message zones 342, a similar file providing zone 343 and a plurality of operation zones for social feedback messages. The basic data zone 341 comprises the photo of an object, the file name, the owner, the established date, the modified date, the size of the file, and the file descriptions, etc. The social network feedback message zones 342 comprises the total numbers (numeral value) of this type of social network feedback messages being currently sent, the user accounts that respectively send this type of social network feedback messages, usually only several user accounts on top of the list would be shown (the top two as shown in figures), or if the space is enough, the corresponding occurrence time and/or the code of local computer 300 can also be shown. As shown in figures, the social network feedback message zones 342 can be for example three social network feedback message zones 342 respectively named as "the share file being opened by", "the share file being favored by" and "the share file being recommended by". The similar file providing zone 343 comprises the number of times that the similar file being provided and the names of the similar files, or if the space is enough, the user accounts that provide the similar files, the corresponding occurrence time and/or the code of local computer 300 can also be shown.

The operation zone comprises a trigger unit 344 (e.g., a press object or a click object) used for sending any social network feedback message to the cloud server 200, a comment content input column 345 and a similar file uploading module 346. The trigger unit 344 used for sending any social network feedback message to the cloud server 200, such as a edition selection, a favor selection and a recommend selection, for example when the favor selection is clicked, a "the share file being favored" message, the name of the corresponding share file, the user account that send the message and the time of the message being sent would be transmitted to the cloud server 200. When the comment content input column 345 is provided with the comment content, a comment content, the name of the corresponding share file, the user account that provides the comment and the occurrence time would be transmitted to the cloud server 200. When the similar file uploading module 346 is used for uploading a similar file relative to the share file 371, the similar file, the name of the corresponding share file, the user account that uploads the similar file and the occurrence time would be transmitted to the cloud server 200.

Moreover, the background data interface module 340 further comprises a comment content zone 347 and a social network feedback history list zone 348. The comment content zone 347 comprises the number of times (numeral value) that the share file 371 being commented, or if the space is enough, the user accounts that provide the comment, the corresponding occurrence time and/or the code of local computer 300 can also be shown. The social network feedback history list zone 348 comprises the number of times (numeral value) that the share file 371 being modified.

What shall be defined is that the mentioned cloud server 200 can be defined as a same server mainframe or a plurality of server mainframes used for synchronizing, backup or other cloud calculation services in the system 100. The local computer 300 can be defined as any type of computing device which utilizes the network 700 to establish connection with the cloud server 200 and has the mentioned storage module 350 with enough capacity, the mentioned local computer 300 can be for example a desktop computer, notebook computer, tablet computer, personal digital assistant, smart phone, etc. The mentioned network 700 can be one or a plurality of wide area networks 700, e.g., Internet or intranet. Moreover, in actual practice, the modules of the mentioned cloud server 200 and the local computer 300 and the databases can be defined as a software for performing the operation, or defined as a hardware working with an electronic unit for performing the operation.

According to the method of providing file-related social network interaction under cloud storage service of the present invention, when share files are synchronized to a file-receiving computer, the social network feedback messages of all the synchronized share files sent by all the social network members can be consolidated to a file folder of the local computer, so the social network trend and operation history of all the share files can be easily to obtain, such as how popular or how many times has the file been shared. In actual practice, the method of providing file-related social network interaction under cloud storage service of the present invention may take the form of a computer program product stored on a computer-readable storage medium having computer-readable instructions embodied in the medium. Any suitable storage medium may be used. In some embodiments, such suitable storage medium may be a non-transitory computer readable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. In other embodiments, other suitable storage mediums may be used, which should not be limited in this disclosure.

Figure 10:
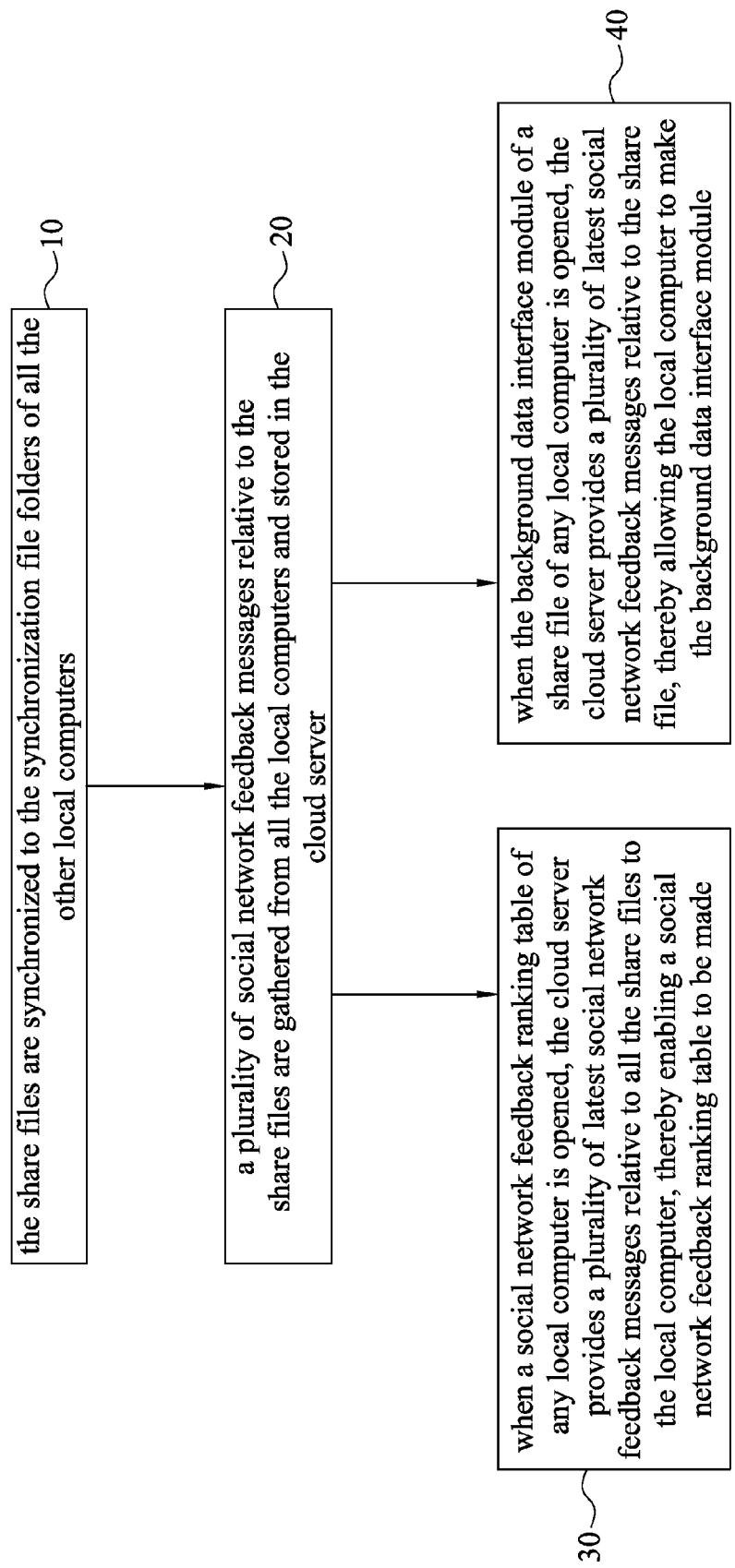
FIG. 10 is a flow chart illustrating the method of providing file-related social network interaction under cloud storage service, according to one embodiment of the present invention.

FIG. 10 is a flow chart illustrating the method of providing file-related social network interaction under cloud storage service.

Referring from FIG. 1 to FIG. 10, one embodiment disclosing the method of social network interaction provided by the present invention comprises the steps of:

In Step 10, the share files are synchronized to the synchronization file folders of all the other local computers. In Step 20, a plurality of social network feedback messages relative to the share files sent are gathered from all the local computers and stored in the cloud server. In Step 30, when a social network feedback ranking table of any local computer is opened, the cloud server provides a plurality of latest social network feedback messages relative to all the share files to the local computer, thereby enabling a social network feedback ranking table to be made. In step 40, when the background data interface module of a share file of any local computer is opened, the cloud server provides a plurality of latest social network feedback messages relative to the share file, thereby allowing the local computer to make the background data interface module.

What shall be addressed is that the step 30 can be processed before or after the step 40, or the step 30 and the step 40 can be consolidated or processed at the same time.

The method of social network interaction disclosed in this embodiment is only provided for a full and clear disclosure and shall not be seen as a limitation to the scope of the present invention.

Referring to FIG. 1, FIG. 2 and FIG. 4, in the step 10, when the file-sharing computer stores the share file 371 in the first sub folder 370, the agent program module 320 transmits the share file 371 to the cloud server 200 through the networks 700. The data synchronizing module 220 of the cloud server 200 receives the share file 371 and backups in the storage content database 250, meanwhile the share file 371 is synchronized to the first sub folder 370 of the file-receiving computer.

Referring to FIG. 1, FIG. 2, FIG. 4 and FIG. 9, in the step 20, when any local computer 300 opens a background data interface module 340 of any share file 371 in the first sub folder 370 through the file management module 330, for example in the file management module 330, move the mouse to the share file 371 then click the right button of the mouse for allowing the "content" selection to be shown, the background data interface module 340 is therefore provided.

When any local computer 300 performs the upload operation of the mentioned social network feedback message in the operation zone of the background data interface module 340, the local computer 300 uploads the social network feedback message relative to the share file 371 and the user account to the social network feedback database 260 of the cloud server 200.

When any local computer 300 performs the uploading operation of the mentioned social network feedback message through the operation zones of the background data interface module 340, the local computer 300 uploads the social network feedback message relative to the share file 371 and the user account to the social network feedback database 260 of the cloud server 200.

For example, when the share file 371 is given with a "favor" selection, the local computer 300 sends a "the share file being favored" message, the name of the corresponding share file, the user account that sends the message and the occurrence time to the cloud server 200; and/or when the share file 371 is given with a "dislike" section, the local computer 300 sends a "the share file being disliked" message, the name of the corresponding share file, the user account that send the message and the occurrence time to the cloud server 200; and/or when the share file 371 is given with a "recommend" selection, the local computer 300 sends a "the share file being recommended" message, the name of the corresponding share file, the user account that sends the message and the occurrence time to the cloud server 200; and/or when a comment content is given to any share file 371, the local computer 300 sends the comment content, the name of the corresponding share file, the user account that sends the comment content and the occurrence time to the cloud server 200.

However, the present invention is not limited to what has been disclosed, the upload operation of the mentioned social network feedback message can also be done through moving the mouse to the share file 371 and click the right button of the mouse for allowing the selection to be shown.

In addition, some types of social network feedback messages do not require operation, and can be automatically uploaded to the social network feedback database 260 of the cloud server 200.

For example, when the share file 371 is opened, the local computer 300 sends a "the share file being opened" message, the name of the corresponding share file, the user account that sends the message and the occurrence time to the cloud server 200; and/or when the share file 371 is edited and stored, the local computer 300 sends a "the share file being edited" message, the name of the corresponding share file, the user account that sends the message and the occurrence time to the cloud server 200.

Thus, the cloud server 200 is able to gather a plurality of social network feedback messages relative to the share file 371 from all the local computers 300 and the user accounts that respectively send the social network feedback messages and to store in social network feedback database 260 of the cloud server 200.

In addition, if any local computer 300 is not able to be currently establish connection with the cloud server 200, the agent program module 320 of the local computer 300 would continuously detect whether the connection with the cloud server being established, when the connection with the cloud server is detected to be recovered, the gathered social network feedback messages and the user account are sent to the cloud server 200 through networks 700.

Referring to FIG. 4, FIG. 5 and FIG. 6, in the step 30, when any local computer 300 opens any social network feedback ranking table 400 (as shown in FIG. 6) in the second sub folder 380 through the file management module 330, the agent program module 320 of the local computer 300 sends a data requiring command through the networks 700 to the cloud server 200. So, the control module 230 of the cloud server 200 transmits a plurality of latest social network feedback messages relative to all the share files 371 and the database statistics of the name of the share files respectively corresponding to the social network feedback messages, to the agent program module 320 of the local computer 300. Thus a social network feedback ranking table 400 can be made by the agent program module 320 with respect to the database statistics.

Thus, the user of the local computer 300 can browse the data contained in the social network feedback ranking table 400 for being informed with the current social network trend regarding to all the synchronized share files 371, such how popular or how many times has the file been shared, operation history such as the record of being opened or edited.

Meanwhile, the user of the local computer 300 is also enabled to click the linkage shortcut of the name of the share file or the user account listed in the social network feedback ranking table 400.

For example, when the linkage shortcut 420 of the user account is clicked, the local computer 300 would require the social network feedback database 260 of the cloud server 200 through the networks 700 to provide all the latest social network feedback messages sent by the user account and the names of the corresponding share files, thereby providing the social network feedback history list 600 relative to the user account. Thus, the user of the local computer 300 can browse the social network feedback history list 600 for understanding a particular user account and his/her favor, feedback or history regarding to the share files.

Meanwhile, the user of the local computer 300 can also click the linkage shortcuts 410 of the names of the share files listed in the social network feedback history list 600. Thus, when the linkage shortcut 410 of the name of the share file listed in the social network feedback ranking table 400 or the social network feedback history list 600 is clicked, the local computer 300 would require the social network feedback database 260 of the cloud server 200 through the networks 700 to provide a plurality of latest social network feedback messages relative to the share file 371 and the user accounts that respectively send the social network feedback messages to the local computer 300, thereby providing a social network feedback history list 500 relative to the name of the share file.

Referring to FIG. 1, FIG. 2, FIG. 4 and FIG. 9, in the step 40, when any local computer 300 opens a background data interface module 340 of any share file 371 in the first sub folder 370 of the synchronization file folder 360 through the file management module 330, for example in the file management module 330, move the mouse to the share file 371 then click the right button of the mouse to allow the content selection to be shown, so the local computer 300 would require the social network feedback database 260 of the cloud server 200 to provide a plurality of latest social network feedback messages relative to the particular share file 371 and the user accounts that respectively send the social network feedback messages to the local computer 300, thereby providing the background data interface module 340.

Thus, the user of the local computer 300 can browse the background data interface module 340 of each share file 371, with the background data interface module 340 of each share file 371, the user can be directly informed with the favor trend or operation history among the social network members relative to a particular share file 371.

As what has been disclosed above, in the method and the system of providing file-related social network interaction under cloud storage service and the computer readable recording medium stored with the method provided by the present invention, the file management module of any local computer can be operated for timely sending the social network feedback message relative to the particular synchronized share file, so the social network members can share files and exchange the comments on the share files thereby achieving the objective of social network interaction. In addition, according to the present invention, by gathering the social network feedback messages in the local file folder, the user can be aware of the social network trend regarding all the synchronized share files sent by the social network members, for example how popular and how many times has the file been shared.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method of providing file-related social network interaction under cloud storage service, implemented on a cloud server and a plurality of local computers establishing connections with the cloud server, comprising:
　(a) the cloud server synchronizing a plurality of share files transmitted from any of the local computers to synchronization file folders of all the other local computers;
　(b) the cloud server gathering and storing a plurality of social network feedback messages relative to the share files transmitted from all the local computers, and user accounts that respectively send the social network feedback messages in the cloud server; and
　(c) when a social network feedback ranking table of the synchronization file folder of any of the local computers is opened, the local computer requires the cloud server through networks to provide a plurality of latest social network feedback messages relative to the share files stored in the cloud server and names of the share files respectively corresponding to the social network feedback messages to the local computer, thereby allowing the local computer to make the social network feedback ranking table.

2. The method of providing file-related social network interaction under cloud storage service according to claim 1, wherein according to the number of times that the social network feedback messages have been respectively gathered, the social network feedback ranking table shows several names of the share files ranked as top few based on the number of the times that the corresponding social network feedback messages of the several names of the share files have been sent by a part of the user accounts, the number of the times that the corresponding social network feedback messages of the several names of the share files have been sent by the part of the user accounts, and the part of the user accounts.

3. The method of providing file-related social network interaction under cloud storage service according to claim 2, wherein when a background data interface module of any of the share files of the synchronization file folder of any of the local computers is provided, some of the user accounts respectively having a first linkage shortcut are shown on the background data interface module,
　when any of the first linkage shortcuts is clicked in any of the local computers, the local computer requires the cloud server through the networks to provide all latest social network feedback messages sent by the particular user account and names of the corresponding share files, thereby enabling a social network feedback history list relative to the particular user account to be made.

4. The method of providing file-related social network interaction under cloud storage service according to claim 3, wherein the social network feedback history list comprises the social network feedback messages and names of the corresponding share files, the names of the share files respectively have a second linkage shortcut, when any of the second linkage shortcuts is clicked in any of the local computers, the local computer requires the cloud server through the networks to provide a plurality of latest social network feedback messages relative to the particular share file and user accounts that respectively send the social network feedback messages to the local computer, thereby enabling a social network feedback history list relative to the particular share file to be made.

5. The method of providing file-related social network interaction under cloud storage service according to claim 3, wherein the social network feedback history list comprises the social network feedback messages and names of the corresponding share files, the names of the share files respectively have a second linkage short cut, when any of the second linkage shortcuts is clicked in any of the local computers, the local computer opens the share file corresponding to the name of the share file.

6. The method of providing file-related social network interaction under cloud storage service according to claim 1, wherein after the step (b), further comprising:
　when a background data interface module of any of the share files in the synchronization file folder of any of the local computers is provided, through the networks, the cloud server provides the latest social network feedback messages relative to the particular share file and user accounts that respectively send the social network feedback messages to the local computer, thereby allowing the local computer to provide the background data interface module.

7. The method of providing file-related social network interaction under cloud storage service according to claim 6, wherein the background data interface module comprises the number of times that the social network feedback messages have been gathered and the user accounts that respectively send the social network feedback messages.

8. The method of providing file-related social network interaction under cloud storage service according to claim 7, wherein with respect to the sequence of the social network feedback messages which have been gathered, the background data interface module provides a part of the user accounts ranked as top few based on the sequence of the social network feedback messages of the share files sent by the part of the user accounts.

9. The method of providing file-related social network interaction under cloud storage service according to claim 8, wherein the user accounts of the background data interface module respectively have a first linkage shortcut, when any of the first linkage shortcuts is clicked in any of the local computers, the local computer requires the cloud server through the networks to provide all latest social network feedback messages sent by the particular user account and names of the corresponding share files, thereby enabling a social network feedback history list relative to the particular user account to be made.

10. The method of providing file-related social network interaction under cloud storage service according to claim 9, wherein the social network feedback history list comprises the social network feedback messages and names of the corresponding share files, the names of the share files respectively have a second linkage shortcut, when any of the second linkage shortcuts is clicked in any of the local computers, the local computer requires the cloud server through the networks to provide a plurality of latest social network feedback messages relative to the particular share file and user accounts that respectively send the social network feedback messages to the local computer, thereby enabling a social network feedback history list relative to the particular share file to be made.

11. The method of providing file-related social network interaction under cloud storage service according to claim 9, wherein the social network feedback history list comprises the social network feedback messages and names of the corresponding share files, the names of the share files respectively have a second linkage short cut, when any of the second linkage shortcuts is clicked in any of the local computers, the local computer opens the share file corresponding to the name of the share file.

12. The method of providing file-related social network interaction under cloud storage service according to claim 6, further comprising:
when the background data interface module of any of the share files in the synchronization file folder of any of the local computers is provided, through the background data interface module, the local computer transmits a similar file relative to the share file, the name of the corresponding share file, and the user account that provides the similar file to the cloud server.

13. The method of providing file-related social network interaction under cloud storage service according to claim 1, wherein the social network feedback message comprises a "the share file being opened" message, a "the shared file being edited" message, a "the share file being favored" message, a "the shared file being disliked" message, a "the share file being recommended" message, a comment about the share file or a combination thereof.

14. The method of providing file-related social network interaction under cloud storage service according to claim 13, wherein when any of the share files is opened in any of the local computers, the local computer sends a "the share file being opened" message, the name of the corresponding share file, the user account that sends the message and the occurrence time to the cloud server.

15. The method of providing file-related social network interaction under cloud storage service according to claim 13, wherein when any of the share files is edited and stored in any of the local computers, the local computer sends a "the share file being edited" message, the name of the corresponding share file, the user account that sends the message and the occurrence time to the cloud server.

16. The method of providing file-related social network interaction under cloud storage service according to claim 13, wherein when any of the share files is given with a "favor" selection in any of the local computers, the local computer sends a "the share file being favored" message, the name of the corresponding share file, the user account that sends the message and the occurrence time to the cloud server.

17. The method of providing file-related social network interaction under cloud storage service according to claim 13, wherein when any of the share files is given with a "dislike" selection in any of the local computers, the local computer sends a "the share file being disliked" message, the name of the corresponding share file, the user account that sends the message and the occurrence time to the cloud server.

18. The method of providing file-related social network interaction under cloud storage service according to claim 13, wherein when any of the share files is given with a "recommend" selection in any of the local computers, the local computer sends a "the share file being recommended" message, the name of the corresponding share file, the user account that sends the message and the occurrence time to the cloud server.

19. The method of providing file-related social network interaction under cloud storage service according to claim 13, wherein when a comment content is given to any of the share files in any of the local computers, the local computer sends the comment content, the name of the corresponding share file, the user account that sends the comment content and the occurrence time to the cloud server.

20. The method of providing file-related social network interaction under cloud storage service according to claim 1, wherein before the step (b), further comprising:
when any of the local computers is not able to currently establish connection with the cloud server, after the connection between the local computer with the cloud server is recovered, at least one of the social network feedback messages and the user account are transmitted to the cloud server through the networks.

21. A system of providing file-related social network interaction under cloud storage service, comprising a cloud server and a plurality of local computers establishing connections with the cloud server, the cloud server comprising:
a data synchronizing module used for synchronizing a plurality of share files to all the local computers through networks; and
a social network feedback database used for recording names of all the share files, a plurality of social network feedback messages relative to the share files and a plurality of user accounts that respectively send the social network feedback messages; and
each of the local computers comprises:
a storage module comprising a synchronization file folder, the synchronization file folder is used for storing the share files and a social network feedback ranking table; and an agent program module connected with the storage module, used for generating and sending at least one social network feedback message of at least one of the share files and a user account to the social network feedback database, and when the social network feedback ranking table is actuated, the agent program module receives statistics from the social network feedback database of the cloud server through the networks, thereby enabling the social network feedback ranking table to be made.

22. The system of providing file-related social network interaction under cloud storage service according to claim 21, wherein according to the number of times that the social network feedback messages have been respectively sent, the social network feedback ranking table shows several names of the share files ranked as top few based on the number of the times that the corresponding social network feedback messages of the several names of the share files have been sent by a part of the user accounts, the number of the times that the corresponding social network feedback messages of the several names of the share files have been sent by the part of the user accounts, and the part of the user accounts.

23. The system of providing file-related social network interaction under cloud storage service according to claim 21, wherein each of the local computers further comprises:
    a file management module used for opening a background data interface module of any of the share files, wherein the background data interface module comprises a plurality of latest social network feedback messages relative to the particular share file, the number of times that the social network feedback messages which have been sent, and the user accounts that respectively send the social network feedback messages.

24. The system of providing file-related social network interaction under cloud storage service according to claim 22, wherein the user accounts respectively comprise a first linkage shortcut, after any of the first linkage shortcuts is clicked, the agent program module receives statistics from the social network feedback database of the cloud server through the networks, thereby enabling a social network feedback history list relative to the user account to be made.

25. The system of providing file-related social network interaction under cloud storage service according to claim 24, wherein the social network feedback history list comprises the social network feedback messages and names of the corresponding share files, the names of the share files respectively comprise a second linkage shortcut, after any of the second linkage shortcuts is clicked, the agent program module receives statistics from the social network feedback database of the cloud server through the networks, thereby enabling a social network feedback history list relative to the particular share file to be made.

26. The system of providing file-related social network interaction under cloud storage service according to claim 24, wherein the social network feedback history list comprises the social network feedback messages and names of the corresponding share files, each of the names of the share files comprise a second linkage shortcut, when any of the second linkage shortcuts is clicked, the agent program module opens the share file corresponding to the name of the share file in the local computer.

27. The system of providing file-related social network interaction under cloud storage service according to claim 23, wherein the user accounts respectively comprise a first linkage shortcut, after any of the first linkage shortcuts is clicked, the agent program module receives statistics from the social network feedback database of the cloud server through the networks, thereby enabling a social network feedback history list relative to the user account to be made.

28. The system of providing file-related social network interaction under cloud storage service according to claim 27, wherein the social network feedback history list comprises the social network feedback messages and names of the corresponding share files, the names of the share files respectively comprise a second linkage shortcut, after any of the second linkage shortcuts is clicked, the agent program module receives statistics from the social network feedback database of the cloud server through the networks, thereby enabling a social network feedback history list relative to the particular share file to be made.

29. The system of providing file-related social network interaction under cloud storage service according to claim 27, wherein the social network feedback history list comprises the social network feedback messages and names of the corresponding share files, each of the names of the share files comprise a second linkage shortcut, when any of the second linkage shortcuts is clicked, the agent program module opens the share file corresponding to the name of the share file in the local computer.

30. A system of providing file-related social network interaction under cloud storage service, comprising a local computer, the local computer comprises:
    a storage module comprising a synchronization file folder, the synchronization file folder is used for storing a plurality of share files;
    a file management module used for opening a background data interface module of any of the share files, wherein the background data interface module comprises: a social network feedback message zone; a numeral value stored in the social network feedback message zone and used for representing the number of times of one kind of social network feedback messages which have been gathered; a plurality of user accounts, stored in the social network feedback message zone, the user accounts respectively used to send the kind of the social network feedback messages which are ranked as top few based on the number of the times of the kind of the social network feedback messages which have been sent by the user accounts, wherein each of the user accounts comprises a linkage shortcut, after the linkage shortcut is clicked, a social network feedback history list relative to the user account is opened, the social network feedback history list comprises all names of the share files to which the user account sends social network feedback messages and types of the social network feedback messages which are respectively sent;
    a network interface unit establishing connection with a cloud server through networks; and
    an agent program module receiving the user accounts, the number of the times of the kind of the social network feedback messages which have been gathered, and the types of the social network feedback messages which are respectively sent by the user accounts, from the cloud server through the network interface unit.

31. The system of providing file-related social network interaction under cloud storage service according to claim 30, wherein the names of the share files listed in the social network feedback history list respectively comprise a linkage shortcut, after any of the linkage shortcuts is clicked, a social network feedback history list relative to the particular share file is opened.

32. The system of providing file-related social network interaction under cloud storage service according to claim 30, wherein the names of the share files listed in the social network feedback history list respectively comprise a linkage shortcut, after any of the linkage shortcuts is clicked, a share file corresponding to the name of the share file is opened.

33. A non-transitory computer readable recording medium, provided with a computer program, used for processing a method of providing file-related social network interaction under cloud storage service, wherein the method is implemented on a cloud server and a plurality of local computers establishing connections with the cloud server, and the method comprises:
   (a) the cloud server synchronizing a plurality of share files transmitted from any of the local computers to synchronization file folders of all the other local computers;
   (b) the cloud server gathering and storing a plurality of social network feedback messages relative to the share files transmitted from all the local computers, and user accounts that respectively send the social network feedback messages in the cloud server; and
   (c) when a social network feedback ranking table of the synchronization file folder of any of the local computers is opened, the local computer requires the cloud server through networks to provide a plurality of latest social network feedback messages relative to the share files stored in the cloud server and names of the share files respectively corresponding to the social network feedback messages to the local computer, thereby allowing the local computer to make the social network feedback ranking table.

* * * * *